(12) United States Patent
Haruna et al.

(10) Patent No.: US 8,029,934 B2
(45) Date of Patent: Oct. 4, 2011

(54) LITHIUM SECONDARY BATTERY

(75) Inventors: Hiroshi Haruna, Hitachi (JP); Eiji Hoshi, Hitachi (JP); Kazushige Kohno, Hitachi (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 1076 days.

(21) Appl. No.: 11/782,008

(22) Filed: Jul. 24, 2007

(65) Prior Publication Data

US 2008/0020286 A1    Jan. 24, 2008

(30) Foreign Application Priority Data

Jul. 24, 2006  (JP) .................................. 2006-200175

(51) Int. Cl.
*H01M 6/16* (2006.01)
*H01M 6/04* (2006.01)

(52) U.S. Cl. ........ 429/332; 429/327; 429/326; 429/324; 429/188

(58) Field of Classification Search .................. 429/332, 429/327, 326, 324, 188
See application file for complete search history.

(56) References Cited

FOREIGN PATENT DOCUMENTS

| JP | 11-003728 | 1/1999 |
|---|---|---|
| JP | 2001-057234 | 2/2001 |
| JP | 2001-057237 | 2/2001 |
| JP | 2002-358999 | 12/2002 |
| JP | 2003-317800 | 11/2003 |
| JP | 2004-022379 | 1/2004 |
| JP | 2004-154352 | 6/2004 |

*Primary Examiner* — Helen O Conley
(74) *Attorney, Agent, or Firm* — Antonelli, Terry, Stout & Kraus, LLP.

(57) ABSTRACT

The present invention provides a battery that experiences a small degree of temporal change from the initial battery properties over the long term storage period of the battery. Specifically, the present invention provides a lithium secondary battery, in which a positive electrode capable of storing and releasing lithium and a negative electrode capable of storing and releasing lithium are formed via an electrolyte, wherein: the electrolyte comprises a cyclic solvent and a chain-type solvent and contains a compound having a boron-oxygen bond (B—O) and a carbon-carbon double bond (C=C).

9 Claims, 1 Drawing Sheet

LITHIUM SECONDARY BATTERY

BACKGROUND OF THE INVENTION

1. Field of the Invention

The present invention relates to a lithium secondary battery.

2. Description of Related Art

Recently, demands, including reduction in size and higher energy density have been increasing on power sources for mobile communication devices such as cellular phones and portable personal computers. Meanwhile, midnight power storage systems and power storage systems involving solar cells and wind-power generation have also been increasingly developed. Electric vehicles, hybrid vehicles, and hybrid electric trains using electric power for partial motive energy have been increasingly available for practical use.

However, nonaqueous electrolyte lithium secondary batteries utilizing carbonaceous materials, silicon materials, metal oxides, and the like as negative electrode materials are problematic in that: the organic solvent included in the electrolyte is reductively decomposed on the negative electrode surface in a charge-discharge process; and the negative electrode impedance is increased over time due to the gas generation and the deposition of the reductively decomposed substances of the organic solvent, resulting in the battery capacity degradation.

Accordingly, for the purpose of suppressing the above described reductive decomposition of the organic solvent, various compounds have hitherto been added to the electrolyte as means for suppressing the reductive decomposition of the organic solvent on the negative electrode. Hence, techniques to control the morphology of the negative electrode surface coating have become significant. For example, JP Patent Publication (Kokai) No. 2001-057234 A, JP Patent Publication (Kokai) No. 2004-154352 A, and JP Patent Publication (Kokai) No. 2004-022379 A disclose the addition of vinylene carbonate, a pyridine derivative, and lithium difluoroacetate to the electrolyte, respectively. However, even the use of these compounds as additives results in battery storage properties that are unable to cope with recent demands for higher capacity.

SUMMARY OF THE INVENTION

An object to be achieved by the present invention is to provide a battery that experiences a small degree of temporal change in battery properties from the initial battery properties over the long term storage period of the battery.

The present invention relates to a lithium secondary battery, in which a positive electrode capable of storing and releasing lithium and a negative electrode capable of storing and releasing lithium are formed via an electrolyte. According to the present invention, a lithium secondary battery wherein the electrolyte contains a compound having boron and a carbon-carbon double bond is provided.

Such compound having boron and a carbon-carbon double bond is represented by chemical formula (1), for example, wherein: $R_1$, $R_2$, and $R_3$ are each an organic group having 2-10 carbons; and each contain at least one element selected from the group consisting of hydrogen, sulfur, oxygen, nitrogen, fluorine, chlorine, bromine, and iodine, and the compound contains at least one carbon-carbon double bond. According to the present invention, a nonaqueous electrolyte containing the compound represented by chemical formula (1) and a lithium secondary battery using the nonaqueous electrolyte are provided.

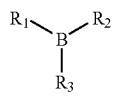

Chemical formula 1

According to the present invention, a lithium secondary battery excellent in storage properties can be provided.

Figure 1:
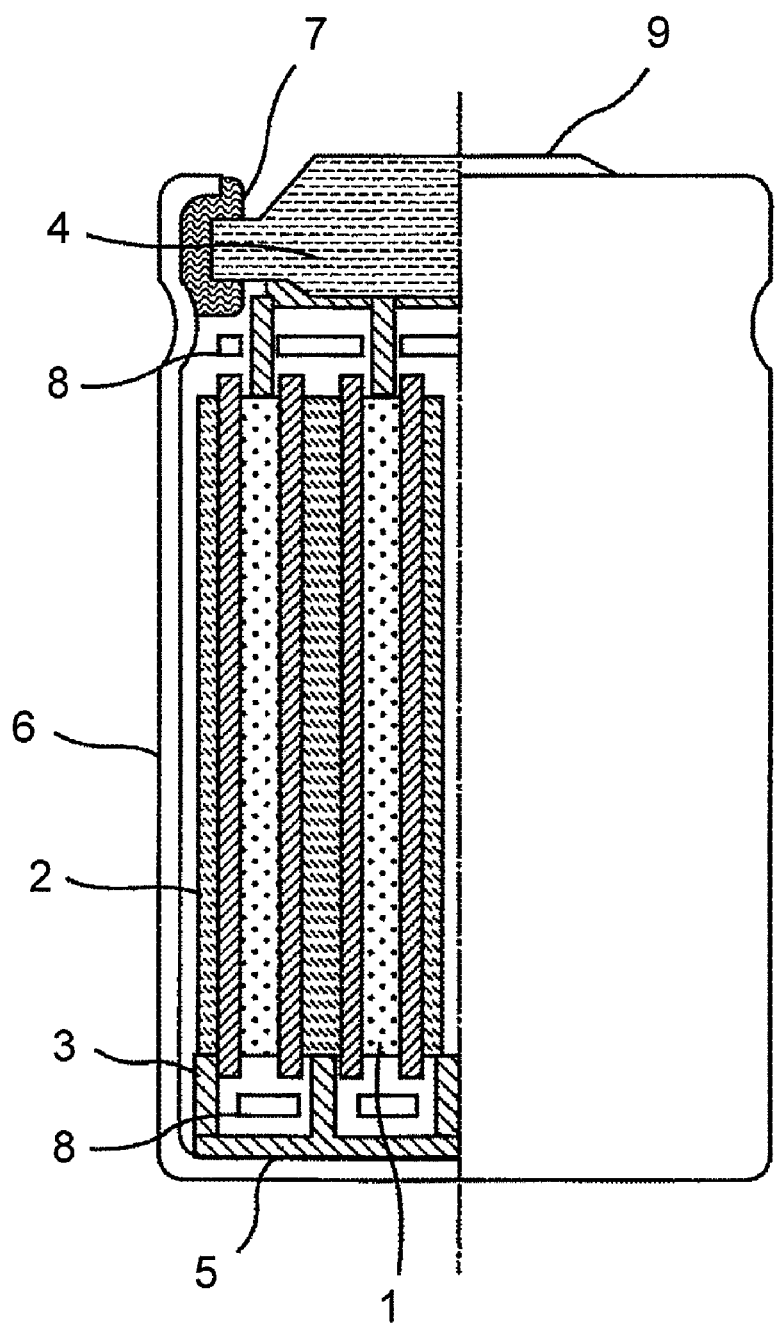
FIG. 1 is a sectional view showing the outline of the battery according to Examples.

Each numeral in FIG. 1 means the following.
1—positive electrode plate
2—negative electrode plate
3—separator
4—positive electrode lead
5—negative electrode lead
6—battery can
7—packing
8—insulating plate
9—sealing cap

DETAILED DESCRIPTION OF THE PREFERRED EMBODIMENTS

According to the present invention, a nonaqueous electrolyte is used. The electrolyte contains a compound having boron and a carbon-carbon double bond and being represented by chemical formula (1) wherein: $R_1$, $R_2$, and $R_3$ are each an organic group having 2-10 carbons; and each contain at least one element selected from the group consisting of hydrogen, sulfur, oxygen, nitrogen, fluorine, chlorine, bromine, and iodine, and the compound contains at least one carbon-carbon double bond.

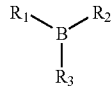

Chemical formula 1

In the present invention, it is considered that the compound having boron and a carbon-carbon double bond is converted into an insoluble polymeric substance on negative electrode surfaces because of a reduction reaction in the initial cycle, so that a film is formed. In the case of such compound having a carbon-carbon double bond, a polymerization reaction is promoted, so that a film capable of more completely covering negative electrode surfaces is generated. As a result, coating performance achieved on the negative electrode surfaces is improved, so that excellent high-temperature storage properties can be obtained.

In addition, the compound having boron and a carbon-carbon double bond preferably has a boron-oxygen bond (B—O bond). In this case, upon reduction reaction, a polymerization reaction is initiated when such a B—O bond is broken.

Unlike a case of adding vinylene carbonate comprising carbon and hydrogen, when a compound containing boron is added and then a film containing boron is generated on negative electrode surfaces, boron is present in a trivalent form within the film. Such trivalent boron has unshared electron pairs and thus has a function of trapping lithium ions (cations) through generation of coordinate linkage with the lithium ions on negative electrode surfaces. This facilitates intercalating and deintercalating of lithium ions accompanying charge and discharge, so that impedance is lowered. Therefore, the control of the film on the negative electrode surfaces may become possible at the molecular level, so that a more highly functional film may be generated.

In addition, the compound having boron and a carbon-carbon double bond should have a decomposition potential on a negative electrode higher than that of an electrolyte. This is because if the decomposition potential of such a compound on a negative electrode is lower than that of an electrolyte, the relevant film is decomposed via charge and discharge and then the electrolyte is also decomposed. Therefore, a compound in the form of a film having a decomposition potential on a negative electrode higher than that of an electrolyte is required to cover the negative electrode surfaces.

Furthermore, it is preferable to add such compound with vinylene carbonate, so that a similar effect can be obtained and the storage property is improved.

Regarding the proportion of the compound having boron and a carbon-carbon double bond, which is used in the present invention, in an electrolyte, such compound is preferably contained in the electrolyte such that it is 0.5% by weight or more with respect to the electrolyte. More preferably, the compound is contained in the electrolyte such that it is between 0.5% and 2.0% by weight and further preferably 0.5% and 1.0% by weight. With less than 0.5% by weight, an electrode surface cannot be coated and sufficient coating effects may not be obtained. Meanwhile, with more than 2.0% by weight, a higher value of resistance tends to be observed because of the thus elevated viscosity of the electrolyte and the resulting poor solubility in the electrolyte. Moreover, when the compound is mixed with vinylene carbonate and then the mixture is added, the compound having boron and a carbon-carbon double bond and vinylene carbonate can be mixed such that the total amount of the mixture is 2.0% by weight with respect to the electrolyte and then used.

Nonaqueous electrolytes to be used in the present invention are cyclic carbonates, chain carbonates, chain carboxylic acid esters, lactone compounds, cyclic ethers, and chain ethers. The nonaqueous electrolytes to be used in the present invention are prepared by dissolving a lithium salt as a solute in a solvent that is a mixture of one, two, or more types of the above solvents. Specific examples of such nonaqueous solvents include ethylene carbonate, propylene carbonate, gamma-butyrolactone, dimethyl carbonate, ethyl methyl carbonate, and diethyl carbonate. Halides such as fluorine substitution products and sulfur substitution products of these solvents can also be used. These solvents may be used independently or as mixtures of two or more types thereof. However, mixed solvent systems are preferred, each of which is composed of: a cyclic solvent having a high dielectric constant and having high viscosity such as a cyclic carbonate or a cyclic lactone; and a chain-type solvent having a small dielectric constant and having low viscosity such as a chain carbonate or a chain ester. The mixing ratio of a cyclic carbonate or a cyclic ester solvent to a chain carbonate solvent preferably ranges from 2:8 to 4:6. Particularly, in the case of lithium secondary batteries for vehicle installation or the like, which require higher output, it is preferable to increase the proportion of a chain-type solvent having lower viscosity. Specifically, a cyclic solvent is preferably 50% by weight or less with respect to a chain-type solvent. As a cyclic solvent, ethylene carbonate is preferable. As chain-type solvents, one or more of dimethyl carbonate and ethyl methyl carbonate are more preferable.

Specific examples of a lithium salt to be used as a solute include $LiPF_6$, $LiBF_4$, $LiClO_4$, $LiAsF_6$, $LiSbF_6$, $LiAlCl_4$, $LiCF_3SO_3$, $Li(CF_3SO_2)_2N$, and $Li(C_2F_5SO_2)_2N$. Preferred among these are $LiPF_6$ and $LiBF_4$. These lithium salts may be used independently or as mixtures each composed of two or more types thereof.

Furthermore, examples of a cathode active material to be contained in a positive electrode include one or more types selected from: layered compounds such as lithium cobaltate ($LiCoO_2$), lithium nickelate ($LiNiO_2$); compounds obtained via substitution with one, two, or more types of transition metals; lithium manganates such as $Li_{1+x}Mn_2-xO_4$ (x=0 to 0.33), $Li_{1+x}Mn_{2-x-y}MyO_4$ (M includes at least one type of metal selected from the group consisting of Ni, Co, Fe, Cu, Al, and Mg, x=0 to 0.33, y=0 to 1.0, and 2-x-y>0), $LiMnO_4$, $LiMn_2O_4$, $LiMnO_2$, $LiMn_{2-x}O_2$ (M includes at least one type of metal selected from the group consisting of Ni, Co, Fe, Cu, Al, and Mg, and x=0.01 to 0.1), and $Li_2Mn_3MO_8$ (M includes at least one type of metal selected from the group consisting of Ni, Co, Fe, and Cu); a copper-lithium oxide ($Li_2CuO_2$); disulfide compounds; mixtures containing $Fe_2(MoO_4)_3$ or the like; and polymers such as polyaniline, polypyrrole, and polythiophene. Of these, a cathode active material to be used in the present invention is preferably a layered type lithium composite oxide represented by $Li[Co_xNi_yMn_z]O_2$ (x+y+c=1, $0 \leq x \leq 1$, $0 \leq y \leq 1$, and $0 \leq z \leq 1$). Moreover, a means of mixing a carbon material can also be employed to improve the electron conductivity of a positive electrode for which these oxides are used.

Examples of a carbon material type that can be used herein include acetylene black and artificial graphite. Furthermore, carbon materials having a specific surface area of $1000 \text{ m}^2/\text{g}$ or more can also be used.

Examples of an anode active material to be contained in a negative electrode include: natural graphite; products obtained by processing an easily graphitizable material (obtained from petroleum coke, coal pitch coke, or the like) at a high temperature ranging from 500° C. to 3000° C.; mesophase carbon; amorphous carbon; carbon fiber; a lithium metal; a metal that alloys with lithium; and a silicon or carbon particle carrying a metal on the surface thereof. Examples of such a metal carried by the carbon material include metals or alloys selected from the group consisting of lithium, aluminum, tin, silicon, indium, gallium, and magnesium. These metals or their oxides may be utilized as anode active materials. Moreover, carbon materials prepared to have a degree of surface crystallinity lower than a degree of crystallinity within the material can be used as an anode active material. An example of a carbon material to be used in such case is graphite. This can be achieved by coating the graphite surface with amorphous carbon. Moreover, carbon materials prepared to have a low degree of surface crystallinity via mechanical processing of graphite that is a carbon material with a high degree of crystallinity can also be used.

In addition, "crystallinity" as referred herein means the degree of crystallization that is a physical property representing the proportion (in terms of mass ratio) of the crystalline portion in a material composed of a crystalline portion and an amorphous portion. Thus, a lower degree of crystallinity means a higher degree of amorphousness.

In general, a decomposition reaction of an electrolyte on a negative electrode tends to take place at edges that graphite has many of them. Hence, a decomposition reaction of an electrolyte can be suppressed via coating with amorphous carbon that has not many edges. However, even when graphite having many edges is used as an anode active material, storage properties can be improved by the addition of the compound of the present invention, which is excellent in coating performance and has boron and a carbon-carbon double bond.

A method for fabricating the lithium secondary battery comprises preparing a slurry by mixing the above cathode active material with a conducting agent made of a carbon material and a binder such as polyvinylidene fluoride (hereinafter, referred to as PVDF). The mixing ratio of the conducting agent to the cathode active material preferably ranges from 5% to 20% by weight. At this time, sufficient kneading is carried out with a mixing machine equipped with mechanical agitation means such as rotary wings for the purpose of homogeneously dispersing the powder particles of the cathode active material in a slurry. The fully mixed slurry is applied on the both surfaces of a 15 to 25 μm thick aluminum foil with a coating machine such as a roll transfer printing coating machine. The aluminum foil thus coated is subjected to press drying to prepare a positive electrode plate. The coated electrode composite preferably has a thickness between 20 μm and 100 μm. For a negative electrode, graphite, amorphous carbon, or a mixture thereof is used as an anode active material. The anode active material is mixed with a binder in a manner same as that for the positive electrode and then the mixture is applied and pressed to prepare the electrode. The electrode composite desirably has a thickness between 20 μm and 70 μm. For the negative electrode, a 7 μm to 20 μm thick copper foil is used as a current collector. The mixing ratio for coating is desirably 90:10 in terms of the weight ratio of the anode active material to the binder, for example. The thus obtained coated electrodes are each cut to have a predetermined length and tabs for taking out the electric current are formed thereon by spot welding or ultrasonic welding. The tabs are formed of metal foils which are the same in material as the rectangular current collectors and are provided for the purpose of taking out the electric current from the electrodes. A lithium secondary battery for mobile devices is required to flow a large electric current and hence a plural number of the tabs should be provided. The electrodes each having the tabs fixed thereon are laminated having a separator made of polyethylene (PE) or polypropylene (PP) between the electrodes. The thus obtained laminate is rolled into a cylindrical shape to form a group of electrodes and the group of electrodes is housed in a cylindrical vessel. Alternatively, bag-like separators may be used to house the electrodes therein and then such separators may be laminated successively to be housed in a rectangular vessel. The material for forming the vessel is desirably stainless steel or aluminum. After the group of electrodes has been housed in the battery vessel, an electrolyte is poured into the vessel and then the vessel is sealed. The concentration of the electrolyte is desirably between 0.7 M and 1.2 M.

The embodiments of the present invention are described below.

Hereinafter, the present invention will be described with reference to Examples of the present invention. However, the present invention is not limited by these Examples.

(Preparation of Electrolyte)

REFERENCE EXAMPLE 1

Ethylene carbonate (EC) and ethyl methyl carbonate (EMC) were mixed at a weight ratio of EC:EMC=1:2 and LiPF$_6$ was dissolved as an electrolyte in the mixture so as to have a concentration of 1.0 mol/liter. To this solution, allyl boronic acid pinacol ester represented by chemical formula (2) as the compound having boron and a carbon-carbon double bond within a molecule was added to a content of 0.1% by weight. Thereby, a lithium battery electrolyte of Reference example 1 was prepared.

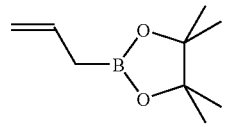

Chemical formula 2

EXAMPLES 1 TO 4

Ethylene carbonate (EC) and ethyl methyl carbonate (EMC) were mixed at a weight ratio of EC:EMC=1:2. LiPF$_6$ was dissolved as an electrolyte at the mixture so as to have a concentration of 1.0 mol/liter. To the thus prepared solutions, allyl boronic acid pinacol ester represented by chemical formula (2) as the compound having boron and a carbon-carbon double bond within a molecule was added to the contents of 0.5%, 1.0%, 1.5%, and 2.0% by weight, thereby preparing lithium secondary battery electrolytes of Examples 1 to 4, respectively.

EXAMPLE 5

Ethylene carbonate (EC) and ethyl methyl carbonate (EMC) were mixed at a weight ratio of EC:EMC=1:2. LiPF$_6$ was dissolved as an electrolyte in the mixture so as to have a concentration of 1.0 mol/liter. 1.0% by weight allyl boronic acid pinacol ester represented by chemical formula (2) as the compound having boron and a carbon-carbon double bond within a molecule and 1.0% by weight vinylene carbonate (VC) were mixed. The mixture was dissolved in the solution such that the amount of the mixture was 2.0% by weight with respect to the electrolyte.

COMPARATIVE EXAMPLE 1

Ethylene carbonate (EC) and ethyl methyl carbonate (EMC) were mixed at a weight ratio of EC:EMC=1:2. LiPF$_6$ was dissolved as an electrolyte in the mixture so as to have a concentration of 1.0 mol/liter.

COMPARATIVE EXAMPLE 2

Ethylene carbonate (EC) and ethyl methyl carbonate (EMC) were mixed at a weight ratio of EC:EMC=1:2. LiPF$_6$ was dissolved as an electrolyte in the mixture so as to have a concentration of 1.0 mol/liter. The solution was mixed with VC so that VC was 1.0% by weight with respect to the solution, thereby preparing a lithium secondary battery electrolyte.

(Fabrication of Cylindrical Battery)

The lithium secondary battery of the present invention was fabricated as follows. As the positive electrode material, Li[Co$_{1/3}$Ni$_{1/3}$Mn$_{1/3}$]O$_2$ was used. A slurry was prepared by dispersing a 85% by weight positive electrode material and a conducting agent (obtained by mixing agglomerate graphite and acetylene black at a ratio of 9:2) in an N-methylpyrrodinone (hereinafter, referred to as NMP) solution (previously prepared to have 5% by weight PVDF as a binder). The mixing ratio (weight ratio) among the active material, the conducting agent, and PVDF was 85:10:5. One surface of a 20 μm thick aluminum foil (a positive electrode current collector) was coated with the slurry substantially uniformly and evenly. After coating, the coated slurry was dried at 80° C. Both surfaces of the aluminum foil were coated and dried in the same manner as described above. The thus coated aluminum foil was subjected to compression molding with a roll press and then cut to have a coating width of 5.4 cm and a coating length of 50 cm. An aluminum-foil lead tab for taking out the electric current was welded onto the cut aluminum foil to prepare a positive electrode plate.

Furthermore, a negative electrode plate was prepared as follows. As the anode active material, a carbon material obtained by coating a surface of graphite carbon with amorphous carbon was used. A negative electrode slurry was prepared by mixing the anode active material and the NMP solution of PVDF and then sufficiently kneading the mixture. The mixing ratio (weight ratio) of the anode active material to PVDF was 90:10. A surface of a 10 μm-thick rolled copper foil (a negative electrode current collector) was coated substantially uniformly and evenly with the slurry. In the same manner as in the case of the positive electrode, both surfaces of the rolled copper foil were coated with the slurry and then dried. After coating, the thus prepared coated copper foil was subjected to compression molding with a roll press and then cut to have a coating width of 5.6 cm and a coating length of 54 cm. A copper-foil lead tab was welded onto the cut copper foil, so as to prepare a negative electrode plate.

A cylindrical battery schematically shown in FIG. 1 was fabricated using the thus prepared positive electrode plate and negative electrode plate. The prepared positive electrode plate 1, the prepared negative electrode plate 2, and a separator 3 were rolled together in such a way that the separator 3 was interposed between such electrodes such that such electrodes were not in contact with each other. Hence, a group of electrodes was prepared. At this time, a positive electrode plate lead 4 and a negative electrode plate lead 5 of the group of electrodes were disposed on the ends (of the group of electrodes) opposite to each other. Further, the composite coated portion of the positive electrode was provided so as not be out of the composite coated portion of the negative electrode. A microporous polypropylene film with a thickness of 40 μm and a width of 5.8 cm was used as a separator. The group of electrodes was inserted into an SUS battery can 6, the negative electrode lead 5 was welded onto the bottom of the can, and the positive electrode lead 4 was welded to a sealing cap 9 also serving as a positive electrode current terminal. Further, each lithium secondary battery electrolyte described in Examples was poured into the battery can and then the sealing cap 9 with the positive electrode terminal fixed thereon was caulked to the battery can 6 via packing 7 to seal the can. Thus a cylindrical battery with a diameter of 18 mm and a length of 65 mm was fabricated. An escape valve was disposed on the sealing cap 9 to release the internal pressure of the battery through the cracking thereof when the internal pressure of the battery increases. In addition, reference numeral 8 denotes an insulating plate.

(Battery Storage Test)

The lithium secondary batteries were fabricated by pouring the electrolytes described in Reference example 1, Examples 1 to 5, and Comparative examples 1 and 2 and then a storage test was carried out. Each of the batteries was charged at 25° C. with a constant charging current of 1200 mA and a constant voltage of 4.1 V and then discharged with a constant discharging current of 1200 mA and a battery voltage of 2.7 V. This charging and this discharging composed one process cycle. As preliminary processing, two instances of the above described charge-discharge cycle were carried out (hereinafter, this charge-discharge process is referred to as initialization). The thus initialized battery was charged so as to reach a battery voltage of 3.65 V with a constant current of 1200 mA and a constant voltage of 3.65 V for 3 hours, and then the battery was allowed to stand at normal pressure and at 50° C. for 60 days. The battery storage test was carried out as described above.

Under the above conditions, the storage test was carried out using the nonaqueous electrolytes described in Reference example 1, Examples 1 to 5, and Comparative examples 1 and 2. Table 1 shows the discharge capacity retention rates on day 60.

TABLE 1

|  | Amount of VC added (% by weight) | Amount of allyl boronic acid pinacol ester added (% by weight) | Discharge capacity retention rate (%) on day 60 |
| --- | --- | --- | --- |
| Reference example 1 | — | 0.1 | 85.0 |
| Example 1 | — | 0.5 | 89.9 |
| Example 2 | — | 1.0 | 90.4 |
| Example 3 | — | 1.5 | 89.4 |
| Example 4 | — | 2.0 | 85.7 |
| Example 5 | 1.0 | 1.0 | 86.8 |
| Comparative example 1 | — | — | 85.2 |
| Comparative example 2 | 1.0 | — | 86.0 |

The discharge capacity retention rate used herein was obtained as follows. Residual discharge capacity was measured after the storage test, two charge-discharge cycles were carried out again, and then the discharge capacity measured at the second cycle was represented by a value relative to the discharge capacity upon initialization in the second cycle assumed to be 100. The residual discharge capacity used herein means the residual electric capacity found when the battery is discharged with a constant discharge current of 1200 mA and a battery voltage of 2.7 V after the storage test.

The use of the compound having boron and a carbon-carbon double bond of the present invention was found to result in better storage properties than in cases in which no such compound was used. Furthermore, the amount of the compound (having boron and a carbon-carbon double bond) added is preferably 0.5% by weight or more with respect to an electrolyte. When the amount of the compound added is less than 0.5% by weight, an electrode surface cannot be adequately coated, and thus sufficient coating effects cannot be obtained.

Moreover, it was also demonstrated that the addition of the mixture of vinylene carbonate and the compound having boron and a carbon-carbon double bond results in excellent high-temperature storage properties.

Based on the above results, it was demonstrated that lithium ion secondary batteries obtained by dissolving the compound having boron and a carbon-carbon double bond in an electrolyte were excellent in terms of high-temperature storage properties.

What is claimed is:

1. A lithium secondary battery, in which a positive electrode capable of storing and releasing lithium and a negative electrode capable of storing and releasing lithium are formed via an electrolyte, wherein the electrolyte contains a compound having a boron-oxygen bond and a carbon-carbon double bond and being 0.5% by weight or more with respect to the electrolyte, the compound being represented by chemical formula (2)

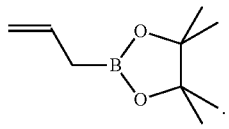

Chemical formula 2

2. The lithium secondary battery according to claim 1, wherein the electrolyte contains a cyclic solvent and a chain-type solvent and the cyclic solvent is 50% by weight or less with respect to the chain-type solvent.

3. The lithium secondary battery according to claim 1, wherein an anode active material is contained in the negative electrode, and the anode active material is a carbon material having a degree of crystallinity in its peripheral part lower than that in its internal part.

4. The lithium secondary battery according to claim 3, wherein the carbon material is graphite.

5. The lithium secondary battery according to claim 1, wherein the compound is contained in the electrolyte such that it is between 0.5% and 2.0% by weight with respect to the electrolyte.

6. The lithium secondary battery according to claim 1, wherein the electrolyte contains vinylene carbonate.

7. The lithium secondary battery according to claim 2, wherein the cyclic solvent is ethylene carbonate and the chain-type solvent is one or more of ethyl methyl carbonate and dimethyl carbonate.

8. The lithium secondary battery according to claim 1, wherein the electrolyte contains the compound and vinylene carbonate, the total amount of the compound and the vinylene carbonate being 2.0% by weight or less with respect to the electrolyte.

9. The lithium secondary battery according to claim 1, wherein the decomposition potential on the negative electrode of the compound is higher than that of the electrolyte.

* * * * *